United States Patent
Tsuda et al.

(10) Patent No.: US 10,047,674 B2
(45) Date of Patent: Aug. 14, 2018

(54) EXHAUST DEVICE FOR ENGINE

(71) Applicant: MAZDA MOTOR CORPORATION, Hiroshima (JP)

(72) Inventors: Amane Tsuda, Hatsukaichi (JP); Hiroaki Deguchi, Hiroshima (JP); Yasushi Niwa, Higashihiroshima (JP); Noriyuki Maruoka, Hiroshima (JP); Kazuya Niida, Hiroshima (JP); Kentaro Nomura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 669 days.

(21) Appl. No.: 14/629,923

(22) Filed: Feb. 24, 2015

(65) Prior Publication Data

US 2015/0240750 A1 Aug. 27, 2015

(30) Foreign Application Priority Data

Feb. 27, 2014 (JP) ................................. 2014-036956

(51) Int. Cl.
*F02C 6/12* (2006.01)
*F01N 13/00* (2010.01)
(Continued)

(52) U.S. Cl.
CPC .............. *F02C 6/12* (2013.01); *F01N 13/009* (2014.06); *F02M 26/05* (2016.02); *F02M 26/06* (2016.02);
(Continued)

(58) Field of Classification Search
CPC .......... F02C 6/12; F02M 26/05; F02M 26/06; F02M 26/28; F01N 13/009; Y02T 10/146; F05D 2220/40
(Continued)

(56) References Cited

U.S. PATENT DOCUMENTS 8,209,980 B2 7/2012 Takagawa et al.
2007/0283686 A1 12/2007 Ohkubo et al.
(Continued)

FOREIGN PATENT DOCUMENTS

CN 101050717 A 10/2007
CN 103277180 A 9/2013
(Continued)

OTHER PUBLICATIONS

The First Office Action issued by the Chinese Patent Office dated Dec. 27, 2016, which corresponds to Chinese Patent Application No. 201510083994.2 and is related to U.S. Appl. No. 14/629,923; with English language summary.
(Continued)

*Primary Examiner* — Jason Newton
(74) *Attorney, Agent, or Firm* — Studebaker & Brackett PC

(57) ABSTRACT

An exhaust device for an engine includes an engine main body having a cylinder head provided with a manifold exhaust passage formed with a gathering exhaust port, a turbo supercharger, a catalyst device provided adjacent to the turbo supercharger, and a processing device disposed on the same side as the cylinder head surface of the engine main body. The processing device includes an exhaust gas processing device and an EGR device. The turbo supercharger guides exhaust gas discharged from the gathering exhaust port upward. The catalyst device includes a carrier, and a container which allows the exhaust gas to pass through a lower region of the carrier. The EGR device and the exhaust gas processing device are at least disposed below the catalyst device.

17 Claims, 5 Drawing Sheets

(51) Int. Cl.
*F02M 26/05* (2016.01)
*F02M 26/06* (2016.01)
*F02M 26/28* (2016.01)

(52) U.S. Cl.
CPC ......... *F02M 26/28* (2016.02); *F05D 2220/40* (2013.01); *Y02T 10/146* (2013.01)

(58) Field of Classification Search
USPC ....................................................... 60/605.2
See application file for complete search history.

(56) References Cited

U.S. PATENT DOCUMENTS

| | | | | |
|---|---|---|---|---|
| 2008/0112865 | A1* | 5/2008 | Alward | B01D 39/2082 423/212 |
| 2010/0095671 | A1* | 4/2010 | Takagawa | F01N 3/2006 60/602 |
| 2010/0326054 | A1* | 12/2010 | Kato | F01N 3/035 60/280 |
| 2014/0150757 | A1* | 6/2014 | Drangel | F02M 25/07 123/568.11 |
| 2014/0196701 | A1* | 7/2014 | Stojkovic | F02M 25/0754 123/568.12 |
| 2015/0314236 | A1* | 11/2015 | Patel | F16L 23/16 285/363 |
| 2015/0361985 | A1* | 12/2015 | Edwards | F02B 37/00 60/602 |
| 2016/0177850 | A1* | 6/2016 | Mogavero | F02D 41/0007 60/602 |
| 2016/0177859 | A1* | 6/2016 | Gatti | F02D 41/0255 701/103 |
| 2016/0319771 | A1* | 11/2016 | Lavazza | F02F 1/16 |

FOREIGN PATENT DOCUMENTS

| | | | | |
|---|---|---|---|---|
| JP | 2010216333 | A * | 9/2010 | ......... F01N 13/1805 |
| JP | 4803059 | B2 | 8/2011 | |
| JP | 2012-057519 | A | 3/2012 | |
| WO | 2012/110720 | A1 | 8/2012 | |

OTHER PUBLICATIONS

Office Action mailed by the German Patent and Trademark Office dated May 24, 2018, which corresponds to German Patent Application No. 10 2015 002 374.8 and is related to U.S. Appl. No. 14/629,923.

* cited by examiner

EXHAUST DEVICE FOR ENGINE

BACKGROUND OF THE INVENTION

Field of the Invention

The present invention relates to an exhaust device for an engine provided with a turbo supercharger.

Background Art

In recent years, an engine provided with a turbo supercharger has been paid attention to in view of a demand for downsizing. Japanese Patent No. 4803059 discloses an engine provided with a cylinder head in which an exhaust manifold is integrally formed; a turbo supercharger which is fixed to a side surface of the cylinder head and communicates with a gathering portion of the exhaust manifold; and an exhaust pipe provided with a catalyst device and coupled to the turbo supercharger in the cylinder array direction.

The engine structure as described above is advantageous in making the engine as a whole compact while enhancing the supercharging pressure characteristics of the engine, and in reducing the number of assembling steps, as compared with an engine provided with an exhaust manifold separately from a cylinder head. Further, high-temperature exhaust gas discharged from the cylinder head is fed to the catalyst device only through the turbo supercharger. Therefore, the engine structure is also advantageous in the aspect of promoting activation of the catalyst device.

In an engine, it is important to reduce NOx (nitrogen oxide) in exhaust gas. As one of the measures, it is effective to carry out EGR (Exhaust Gas Recirculation) control of recirculating part of exhaust gas to an intake passage. Further, in some cases, it is necessary to provide an exhaust gas processing device in order to trap fine particles such as soot contained in the exhaust gas. There is an idea of carrying out EGR control or trapping fine particles within exhaust gas in order to improve exhaust gas characteristics, as well as in the engine disclosed in Japanese Patent No. 4803059. In such a case, it is important to dispose an EGR device and an exhaust gas processing device in a compact manner, taking into consideration a positional relationship with respect to a turbo supercharger and a catalyst device in order to make the engine compact. Japanese Patent No. 4803059, however, fails to disclose the above point.

When EGR control is carried out, the combustion temperature is lowered, which may lower the temperature of exhaust gas. This may make it difficult to activate the exhaust gas purification catalyst. The same problem as described above may also occur in a diesel engine having a high combustion efficiency. In view of the above, it is desirable to provide a configuration advantageous in activating a catalyst device and the like when an EGR device and an exhaust gas purification device are provided.

SUMMARY OF THE INVENTION

In view of the above, an object of the invention is to provide an exhaust device for a multicylinder engine provided with a turbo supercharger, a catalyst device, and a processing device constituted of an exhaust gas processing device and an EGR device, which contributes to activation of the catalyst device, while making the engine compact.

An aspect of the invention is directed to an exhaust device for an engine provided with a plurality of cylinders. The exhaust device for an engine is provided with an engine main body including a cylinder head provided with a manifold exhaust passage therein, the manifold exhaust passage including a gathering exhaust port which communicates with each of the cylinders, the gathering exhaust port being formed in a surface of the cylinder head in an engine width direction orthogonal to a cylinder array direction; a turbo supercharger disposed on the same side as the cylinder head surface and configured to rotate a turbine by exhaust gas discharged from the gathering exhaust port so as to compress intake air; a catalyst device disposed adjacent to the turbo supercharger in the cylinder array direction, and configured to subject a specific component in the exhaust gas that has passed through the turbo supercharger to reaction into a harmless component; and a processing device disposed on the same side as the cylinder head surface of the engine main body. The turbo supercharger is configured to guide the exhaust gas discharged from the gathering exhaust port upward so as to rotate the turbine while forming an upward swirling flow of exhaust gas. The catalyst device is provided with a carrier on which a catalyst is carried, and a container which accommodates the carrier and has an exhaust gas inlet and an exhaust gas outlet on both ends of a lower region of the carrier so as to allow the exhaust gas to mainly pass through the lower region of the carrier in the cylinder array direction. The processing device is at least disposed below the catalyst device.

These and other objects, features and advantages of the present invention will become more apparent upon reading the following detailed description along with the accompanying drawings.

DETAILED DESCRIPTION OF THE PREFERRED EMBODIMENTS OF THE INVENTION

Figure 1:
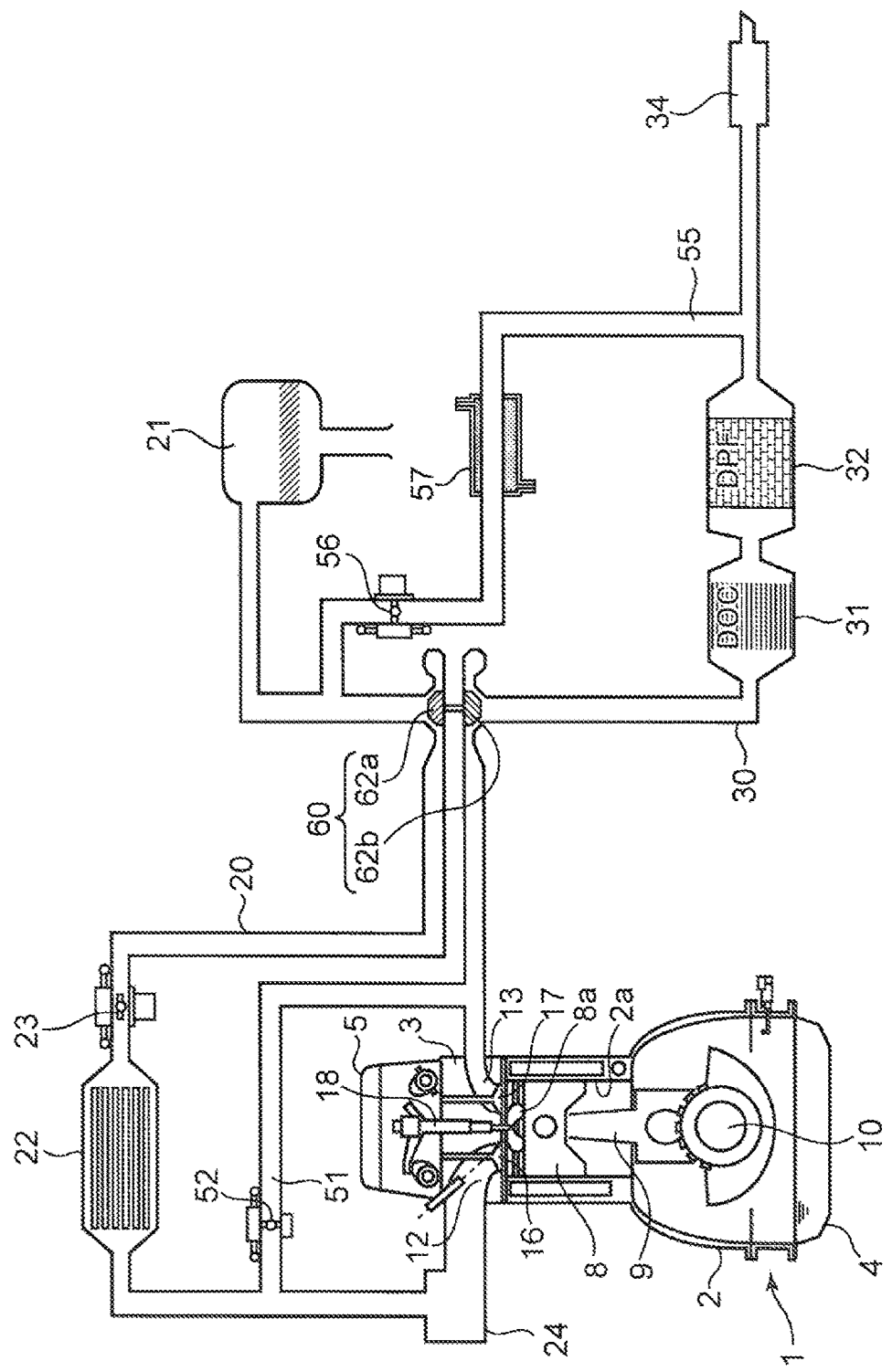
FIG. 1 is a schematic diagram illustrating an overall configuration of an engine (a diesel engine) to which an exhaust device for an engine according to an embodiment of the invention is applied.

In the following, a preferred embodiment of the present invention is described referring to the drawings.

FIG. 1 is a schematic diagram illustrating an overall configuration of a diesel engine to which an embodiment of the invention is applied. In FIG. 1, the diesel engine is a 4-cycle diesel engine provided with turbo supercharger to be loaded in a vehicle, as a power source for driving the vehicle.

An engine main body 1 of the diesel engine (hereinafter, simply called as an engine) is an in-line multiple cylinder engine. The engine main body 1 includes a cylinder block 2 provided with two or more cylinders 2a (in FIG. 1, only one cylinder is illustrated), a cylinder head 3 disposed on the cylinder block 2, an oil pan 4 disposed under the cylinder block 2 and configured to store lubrication oil therein, and a cylinder head cover 5 for covering an upper portion of the cylinder head 3.

A piston 8 is reciprocatably received in each of the cylinders 2a of the engine main body 1. A cavity for defining a combustion chamber 8a is formed in a top surface of each piston 8.

Each piston 8 is connected to a crankshaft 10 via a connecting rod 9. The crankshaft 10 is rotated around an axis of rotation thereof in accordance with a reciprocal motion of each piston 8.

The cylinder head 3 has an intake port 12 and an exhaust port 13 opened toward the combustion chamber 8a of each cylinder 2a. The cylinder head 3 is further provided with intake valves 16 and exhaust valves 17 for opening and closing the intake ports 12 and the exhaust ports 13.

The cylinder head 3 is provided with an injector 18 for injecting fuel containing light oil as a main component for each of the cylinders 2a. Each injector 18 is disposed at such a position that an injection port (a fuel injection port) formed in a tip end of the injector 18 faces the cavity in the top surface of each piston 8. Each injector 18 injects fuel toward the combustion chamber 8a at an appropriate timing before or after the compression top dead center (at the time when a compression stroke ends).

An intake passage 20 is connected to a surface of the engine main body 1 in the engine width direction (left and right directions in FIG. 1) orthogonal to the array direction of the cylinders 2a so as to communicate with the intake port 12 of each cylinder 2a. An exhaust passage 30 is connected to the other surface of the engine main body 1 so as to communicate with the exhaust port 13 of each cylinder 2a. Specifically, intake air from the outside is introduced to the combustion chambers 8a through the intake passage 20 and the intake ports 12, and exhaust gas (combustion gas) generated in the combustion chambers 8a is discharged to the outside through the exhaust ports 13 and the exhaust passage 30.

A turbo supercharger 60 is provided at the intake passage 20 and the exhaust passage 30. The turbo supercharger 60 includes a compressor 62a disposed in the intake passage 20, and a turbine 62b coaxially coupled to the compressor 62a and disposed in the exhaust passage 30.

The turbo supercharger 60 is driven by exhaust energy to compress the intake air. Specifically, when high-temperature and high-speed exhaust gas passes through the exhaust passage 30 during operation of the engine, the turbine 62b of the turbo supercharger 60 is rotated by the energy of the exhaust gas, and the compressor 62a coupled to the turbine 62b via a coupling shaft 62c (see FIG. 3) is concurrently rotated. According to the above operation, air (intake air) passing through the intake passage 20 is compressed to a high pressure, and the compressed air is fed to each cylinder 2a of the engine main body 1.

An air cleaner 21 for filtrating intake air is provided at an upstream end of the intake passage 20. A surge tank 24 is provided at a position near a downstream end (near the engine main body 1) of the intake passage 20. The intake passage 20 on the downstream side of the surge tank 24 is formed into independent passages branched individually for the cylinders 2a. Downstream ends of the independent passages are respectively connected to the intake ports 12 of the cylinders 2a.

The compressor 62a of the turbo supercharger 60, a throttle valve 23 operable to be opened and closed so as to adjust the passage cross section of the intake passage 20, and an intercooler 22 for cooling the air compressed by the compressor 62a are provided in this order from the upstream side between the air cleaner 21 and the surge tank 24 in the intake passage 20. The throttle valve 23 is basically kept in a fully opened state or a highly opened state close to the fully opened state during operation of the engine. The throttle valve 23 is closed only when closing of the throttle valve 23 is necessary e.g. when the engine is stopped. Thereby the intake passage 20 is blocked.

An upstream end of the exhaust passage 30 is formed into a manifold exhaust passage including the independent passages communicating with the exhaust ports 13 of the cylinders 2a, and a gathering portion where the independent passages gather, in other words, formed into an exhaust manifold. Although it is not clearly illustrated in FIG. 1, the exhaust manifold is integrally formed in the cylinder head 3. A gathering exhaust port 3a (see FIG. 2) serving as the gathering portion is formed in a surface of the cylinder head 3. The exhaust passage 30 is formed in such a manner as to communicate with the gathering exhaust port 3a.

The turbine 62b of the turbo supercharger 60, a plurality of kinds of exhaust gas purification devices for removing harmful components contained in exhaust gas, and a silencer 34 for reducing exhaust sound are provided in this order from the upstream side at a position on the downstream side of the exhaust manifold in the exhaust passage 30.

Examples of the exhaust gas purification device are a DOC (Diesel Oxidation Catalyst) 31 and a DPF (Diesel Particulate Filter) 32 in this order from the upstream side. In this example, the DOC 31 corresponds to a catalyst device of the invention, and the DPF 32 corresponds to an exhaust gas processing device as a processing device of the invention.

The DOC 31 oxidizes CO and HC within the exhaust gas discharged from the engine main body 1 into a harmless component. Specifically, CO (carbon oxide) and HC (hydrocarbon) within the exhaust gas are subjected to oxidation while passing through the DOC 31, and are purified to $CO_2$ (carbon dioxide) and $H_2O$ (water). The DOC 31 also plays a role of raising the temperature of exhaust gas by oxidation reaction of exhaust gas that is carried out inside the DOC 31 so as to flow high-temperature exhaust gas toward the DPF 32 disposed downstream of the DOC 31.

The DPF 32 traps fine particles such as soot contained in exhaust gas discharged from the engine main body 1. An example of the DPF 32 is a wall-flow filter made of ceramics such as SiC (silicon carbide). Fine particles within the exhaust gas are trapped by cell walls of the DPF 32 when passing through the cell walls of the DPF 32 from the in-flow side toward the out-flow side. In this example, the DPF 32 is a catalytic filter on which a catalyst (e.g. platinum) for promoting oxidation reaction of exhaust gas is carried. In other words, the DPF 32 is a continuous regenerative filter which raises the temperature of exhaust gas by oxidation reaction of the exhaust gas that is carried out within the DPF 32 so as to burn and remove the trapped fine particles.

Between the intake passage 20 and the exhaust passage 30, there are provided an HP-EGR passage 51 which recirculates part of the high-pressure exhaust gas discharged from the engine main body 1 to a relatively high pressure portion in the intake passage 20, and an LP-EGR passage 55 which recirculates part of low-pressure exhaust gas discharged from the engine main body 1 to a relatively low-pressure portion in the intake passage 20.

Specifically, the HP-EGR passage 51 connects the intake passage 20 between the throttle valve 23 and the surge tank 24, and the exhaust passage 30 between the exhaust manifold and the turbine 62b of the turbo supercharger 60. An EGR valve 52 operable to be opened and closed so as to adjust the recirculation amount of exhaust gas to the intake passage 20 is provided at the HP-EGR passage 51. On the other hand, the LP-EGR passage 55 connects the intake passage 20 between the air cleaner 21 and the compressor 62a of the turbo supercharger 60, and the exhaust passage 30 between the DPF 32 and the silencer 34. An EGR valve 56 operable to be opened and closed so as to adjust the recirculation amount of exhaust gas to the intake passage 20, and an EGR cooler 57 for cooling the recirculated EGR gas by coolant of the engine are provided at the LP-EGR passage 55. In this example, the EGR valve 56 and the EGR cooler 57 provided at the LP-EGR passage 55 correspond to an EGR device as the processing device of the invention.

Recirculating part of exhaust gas from the exhaust passage 30 to the intake passage 20, and replacing part of intake air to be introduced to the cylinders 2a from fresh air to EGR gas of a low oxygen concentration makes it possible to lower the oxygen concentration of the intake air as a whole. Further, lowering the combustion temperature makes it possible to suppress generation of NOx. In this case, controlling the EGR valves 52 and 56 to open and close in accordance with an operation state of the engine main body 1 makes it possible to adjust the amount of high-temperature and high-pressure EGR gas to be recirculated through the HP-EGR passage 51, and the amount of high-temperature and low-pressure EGR gas to be recirculated through the LP-EGR passage 55 in accordance with an operation state of the engine main body 1.

Figure 2:
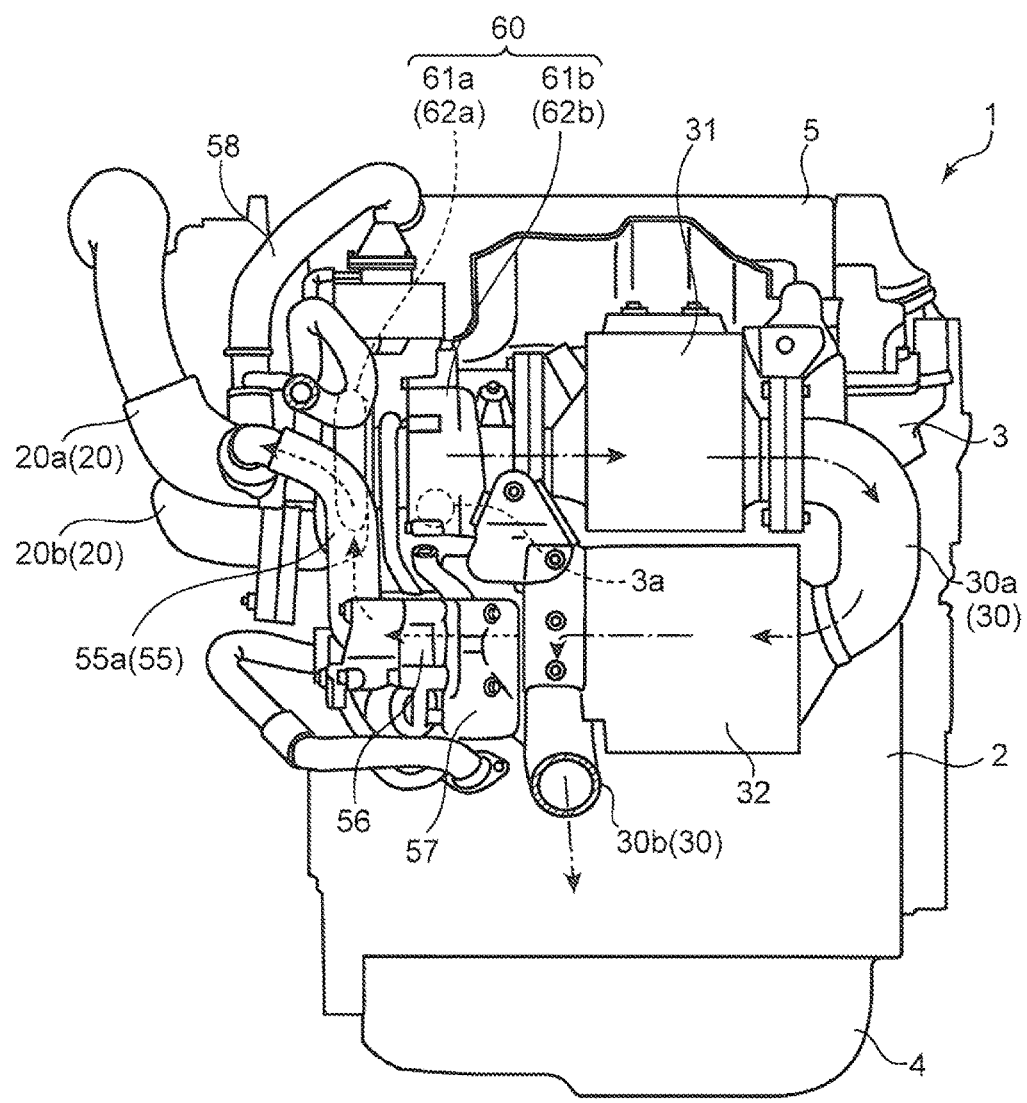
FIG. 2 is a schematic side view of an exhaust portion of the engine.

Next, a concrete structure of the main exhaust system of the engine is described referring to FIG. 2.

FIG. 2 is a side view of an exhaust portion of the engine. In the following, the array direction of the cylinders 2a (cylinder array direction) is defined as front and rear directions of the engine, and unless otherwise particularly specified, the front and rear of each part are in conformity with the front and rear of the engine. Further, the direction orthogonal to the front and rear directions of the engine is defined as the engine width direction.

As illustrated in FIG. 2, the gathering exhaust port 3a of the exhaust manifold is formed in an exhaust-side surface of the engine main body 1 i.e. in the surface of the cylinder head 3. The turbo supercharger 60 is provided at a position corresponding to the gathering exhaust port 3a.

Figure 3:
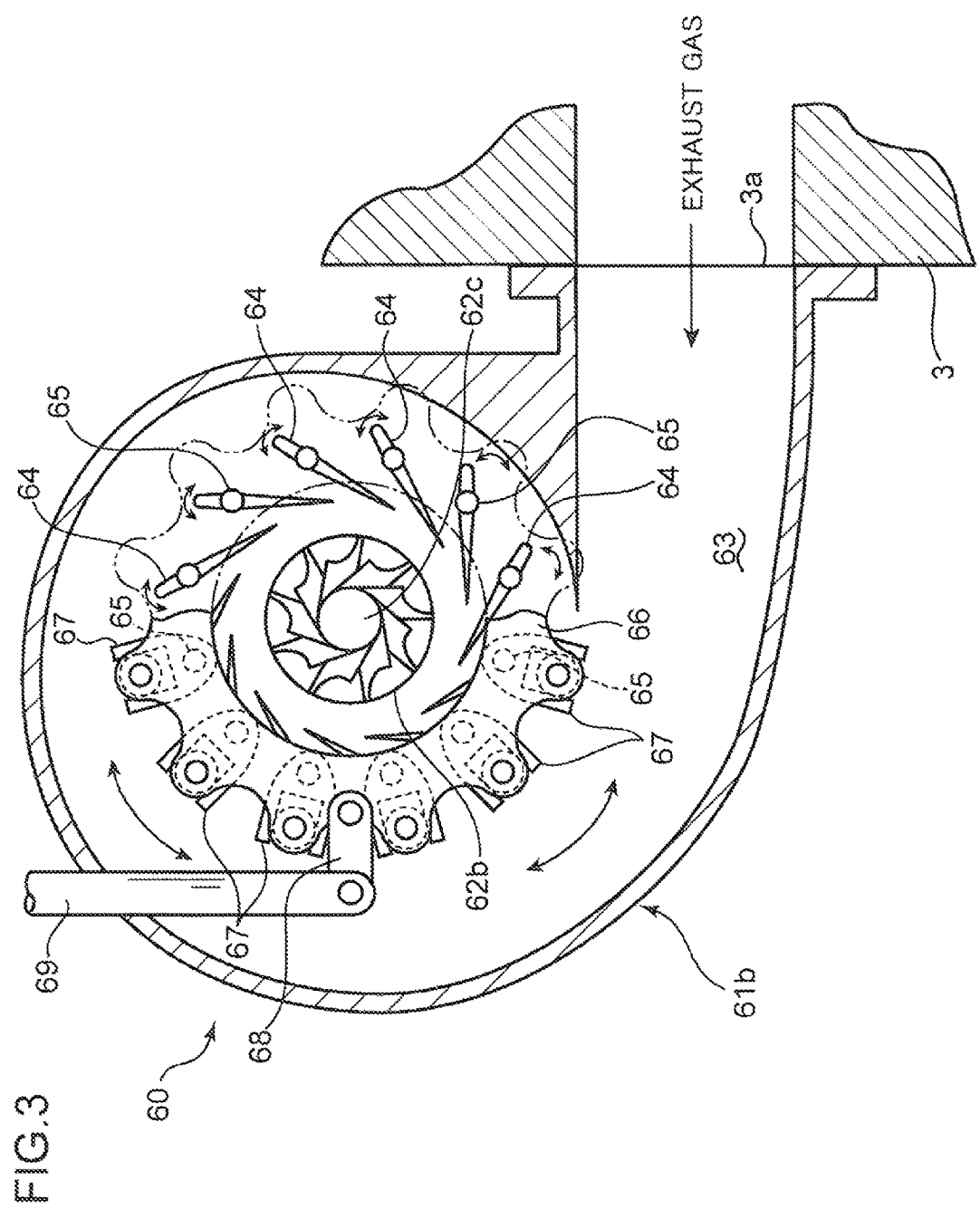
FIG. 3 is a schematic sectional view illustrating a turbo supercharger.

As illustrated in FIG. 3, the turbo supercharger 60 is configured such that the coupling shaft 62c is located at an upper position of the gathering exhaust port 3a to guide a flow of exhaust gas discharged substantially horizontally from the gathering exhaust port 3a upward in a turbine chamber 63 formed within a turbine casing 61b, and to rotate the turbine 62b while forming an upward swirling flow (a clockwise swirling flow in FIG. 3) of exhaust gas. As illustrated in FIG. 3, in the thus-configured turbo supercharger 60, a main part of the turbo supercharger 60 is located at an upper position of the gathering exhaust port 3a. According to this configuration, the turbo supercharger 60 as a whole is disposed at an upper position with respect to the engine main body 1 of the engine.

As illustrated in FIG. 3, the turbo supercharger 60 is a variable geometry turbo supercharger (VGT supercharger) provided with a plurality of movable vanes 64. The turbo supercharger 60 is configured to make the turbine efficiency variable by adjusting a flow of exhaust gas to the turbine 62b by the movable vanes 64. Specifically, as illustrated in FIG. 3, the plurality of movable vanes 64 are disposed in the turbine chamber 63 in such a manner as to surround the turbine 62b disposed substantially in the middle of the turbine chamber 63. Each movable vane 64 is fixed to a support shaft 65 which is rotatably supported on a side wall of the turbine chamber 63. The movable vanes 64 are configured such that when each of the movable vanes 64 swings counterclockwise in FIG. 3 around the support shaft 65, the movable vanes 64 adjacent to each other come close to each other, and the opening degree of a nozzle to be formed between the adjacent movable vanes 64 is decreased; and when each of the movable vanes 64 swings clockwise in FIG. 3, the opening degree of a nozzle to be formed between the adjacent movable vanes 64 is increased. In other words, when the flow rate of exhaust gas is small, it is possible to obtain a high supercharge efficiency by decreasing the opening degree of a nozzle. On the other hand, when the flow rate of exhaust gas is large, it is possible to reduce the ventilation resistance by increasing the opening degree of a nozzle so as to enhance the supercharge efficiency.

Although the detailed illustration of drawings is omitted, a driving mechanism of the movable vanes 64 includes a ring member 66 which is rotatably supported on the turbine casing 61b; a plurality of coupling members 67 which couple the ring member 66 to the respective support shafts 65 so as to rotate each of the support shafts 65 in forward and backward directions, as the ring member 66 is rotated in forward and backward directions; a rod 69 which is supported to be advanced and retracted with respect to the turbine casing 61b; a link 68 which couples the rod 69 to the ring member 66 so as to rotate the ring member 66 in forward and backward directions, as the rod 69 is advanced and retracted; and an unillustrated negative pressure actuator which advances and retracts the rod 69. In other words, the driving mechanism converts a linear motion of the rod 69 by the negative pressure actuator to a rotary motion of each of the support shafts 65 via the link 68, the ring member 66, and the coupling members 67 so as to swing each of the movable vanes 64.

Referring back to FIG. 2, which is a side view of the exhaust portion of the engine main body 1, the DOC 31 is disposed on the engine front side of the turbo supercharger 60. As described above, the DOC 31 oxidizes CO and HC within the exhaust gas into a harmless component.

Figure 4:
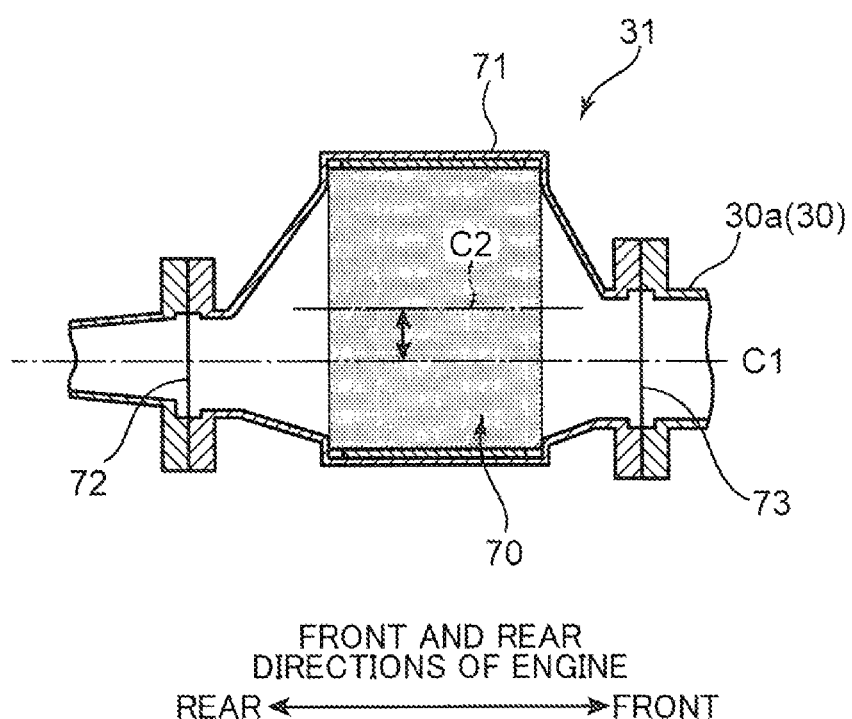
FIG. 4 is a schematic sectional view illustrating a catalyst device.

As illustrated in FIG. 4, the DOC 31 includes a columnar shaped monolith carrier 70 on which a catalyst (e.g. platinum or palladium) is carried, and a casing 71 (a container) which accommodates the carrier 70 in a horizontal posture (a posture in which the center axis of the carrier 70 is aligned horizontally). The casing 71 has a tubular shape extending in front and rear directions. A gas inlet 72 is formed in a rear end (on the turbo supercharger 60 side) of the casing 71, and a gas outlet 73 is formed in a front end of the casing 71. The gas inlet 72 and the gas outlet 73 face each other in front and rear directions. The center of the gas inlet 72 and the center of the gas outlet 73 are substantially coaxially aligned with the coupling shaft 62c of the turbo supercharger 60.

The casing 71 is formed such that exhaust gas introduced from the gas inlet 72 is discharged from the gas outlet 73 in a state that a primary part of the exhaust gas passes through a lower region 70a (see FIG. 5) of the carrier 70. Specifically, the casing 71 is formed so that a centerline C2 of the carrier 70 is offset upward with respect to a centerline C1 passing through the gas inlet 72 and the gas outlet 73. According to this configuration, the DOC 31 as a whole is disposed at an upper position with respect to the engine main body 1. In this example, the centerline of the gas inlet 72 and the centerline of the gas outlet 73 are aligned with each other. However, as far as the centerline C2 of the carrier 70 is offset upward with respect to the centerline of the gas inlet 72 and the centerline of the gas outlet 73 as a whole, slight misalignment of the centerlines of the gas inlet 72 and of the gas outlet 73 is allowed.

A rear portion of the casing 71 with respect to the carrier 70 has a funnel shape such that the casing 71 spreads from the gas inlet 72 toward the perimeter of the carrier 70. A front portion of the casing 71 with respect to the carrier 70 has a funnel shape such that the casing 71 narrows from the perimeter of the carrier 70 toward the gas outlet 73.

Disposing the turbo supercharger 60 and the DOC 31 at an upper position with respect to the engine main body 1 as described above makes it possible to dispose the DPF 32 and the EGR valve 56 in a space formed below the turbo supercharger 60 and the DOC 31.

As illustrated in FIG. 2, the DPF 32 is disposed substantially right below the DOC 31 in proximity to the DOC 31. A front end of the DPF 32 is connected to a front end of the DOC 31 via a U-shaped pipe 30a (a part of the exhaust passage 30). This configuration makes it possible to guide the exhaust gas discharged from the DOC 31 via the gas outlet 73 into the DPF 32 from an unillustrated gas inlet formed in a front end of the DPF 32.

Although not illustrated, the DPF 32 and the DOC 31 are integrally covered by a metal cover from the outside. This prevents heat from being released from the DOC 31 and from the DPF 32, and protects peripheral devices around the DOC 31 and the DPF 32 therefrom when the engine is loaded in the vehicle.

A main exhaust pipe 30b (a part of the exhaust passage 30, corresponds to an exhaust pipe of the invention) communicating with the silencer 34 is connected to a rear end of the DPF 32. The main exhaust pipe 30b extends from the rear end of the DPF 32 slightly obliquely downward toward the outside of the engine main body 1 in the engine width direction.

The EGR cooler 57 is fixed to an attachment portion (not illustrated) formed on a rear surface of the main exhaust pipe 30b (in other words, a surface of the main exhaust pipe 30b opposite to the DPF 32). The EGR valve 56 is fixed to a rear portion of the EGR cooler 57. According to this configuration, the EGR cooler 57 and the EGR valve 56 are disposed at a rear portion of the DPF 32 at a position substantially right below the turbo supercharger 60.

An upstream end of an EGR pipe 55a constituting the LP-EGR passage 55 is connected to a rear portion of the EGR valve 56. A downstream end of the EGR pipe 55a is connected to an upstream intake pipe 20a (a part of the intake passage 20). The upstream intake pipe 20a constitutes the intake passage 20 between the air cleaner 21 and the compressor 62a of the turbo supercharger 60. The upstream intake pipe 20a is connected to a rear portion of the compressor casing 61a of the turbo supercharger 60. The EGR pipe 55a is connected to an intermediate portion of the upstream intake pipe 20a at a position near the connecting portion between the upstream intake pipe 20a and the compressor casing 61a.

The reference sign 20b in FIG. 2 denotes a downstream intake pipe connected to the compressor casing 61a of the turbo supercharger 60. The downstream intake pipe 20b constitutes the intake passage 20 between the intercooler 22 and the compressor 62a of the turbo supercharger 60. Further, the reference sign 58 in FIG. 2 denotes a blow-by gas pipe (passage) for introducing blow-by gas staying in the engine main body 1 to the intake passage 20. The blow-by gas pipe 58 connects between the cylinder head cover 5 and the upstream intake pipe 20a.

In the thus-configured diesel engine, as illustrated by the one-dotted chain line in FIG. 2, exhaust gas discharged from the gathering exhaust port 3a of the engine main body 1 (cylinder head 3) is introduced to the turbo supercharger 60 so as to rotate the turbine 62b. After the exhaust gas passes through the DOC 31 in front and rear directions, the flow direction of the exhaust gas is reversed in front of the DOC 31 so that the exhaust gas is introduced to the DPF 32. After the exhaust gas passes through the DPF 32 in front and rear directions, the exhaust gas is guided to the silencer 34 through the main exhaust pipe 30b. Further, as illustrated by the broken line arrows in FIG. 2, part of the exhaust gas that has passed through the DPF 32 is recirculated to the upstream intake pipe 20a via the EGR cooler 57 and the EGR valve 56.

According to the engine as described above, the turbo supercharger 60, the DOC 31, the DPF 32, and the EGR device (the EGR valve 56 and the EGR cooler 57) are disposed at a position near a surface of the engine main body 1 in a compact manner. This is advantageous in making the engine compact, namely, in downsizing the engine. Further, as a result of gathering the turbo supercharger 60, the DOC 31, the DPF 32, and the EGR device at a position near a surface of the engine main body 1, the ambient temperature around these devices is kept at a relatively high temperature. This prevents heat from being released from the exhaust gas, and contributes to promotion of activation of the DOC 31 and promotion of regeneration (oxidation reaction) of the DPF 32. A diesel engine inherently has a high combustion efficiency, and the temperature of exhaust gas from the diesel engine tends to lower, as compared with a gasoline engine. When EGR control is carried out, the temperature of exhaust gas is particularly lowered. This may make it difficult to maintain the activation temperature of the DOC 31 and the regeneration temperature of the DPF 32. According to the above configuration, however, it is easy to maintain the activation temperature of the DOC 31 and the regeneration temperature of the DPF 32. This is advantageous in promoting activation of the DOC 31 and promoting regeneration of the DPF 32, while making the engine compact.

In the thus-configured engine, the turbo supercharger 60 is configured such that exhaust gas discharged from the gathering exhaust port 3a is guided upward to rotate the turbine 62b while forming an upward swirling flow of exhaust gas. In view of the above, the turbo supercharger 60 as a whole is disposed at an upper position with respect to the engine main body 1. Further, the DOC 31 is configured such that the centerline C2 of the carrier 70 is offset upward with respect to the centerline C1 passing through the gas inlet 72 and the gas outlet 73. Thus, the DOC 31 as a whole is disposed at an upper position with respect to the engine main body 1. In other words, the turbo supercharger 60 and the DOC 31 as a whole are disposed at an upper position with respect to the engine main body 1, and the DPF 32 and the EGR device are disposed in a space below the turbo supercharger 60 and the DOC 31. Therefore, when the engine main body 1 has a relatively small size, or when the turbo supercharger 60 and the DOC 31 have a relatively large size, it is possible to dispose the DPF 32 and the EGR device below the turbo supercharger 60 and the DOC 31 in a compact manner. In this example, the turbo supercharger 60 is a variable geometry turbo supercharger provided with the movable vanes 64 and the driving mechanism for moving the movable vanes 64 as described above. Therefore, the size of the turbo supercharger as a whole tends to increase in the radial direction (in the radial direction of the turbine 62b). By employing the aforementioned configuration, however, in this example, the EGR device is disposed below the turbo supercharger 60 in a compact manner, regardless that the turbo supercharger 60 is a variable geometry turbo supercharger.

Figure 5:
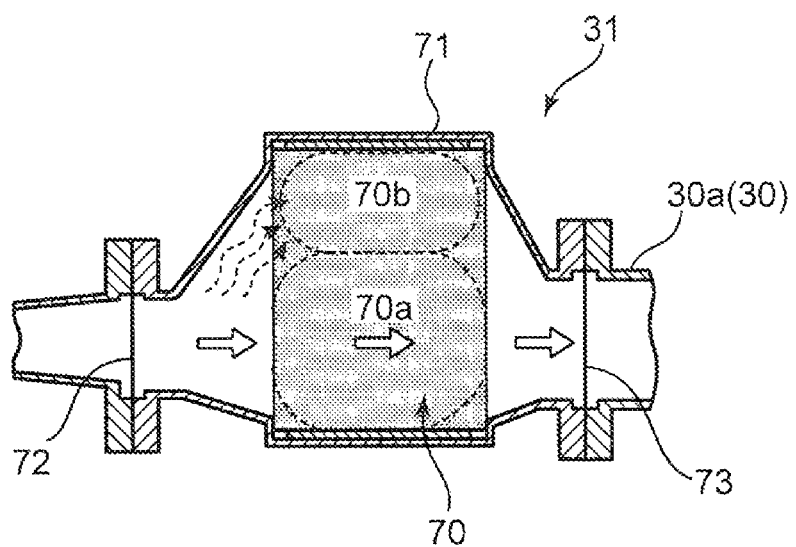
FIG. 5 is a diagram describing an operation of the catalyst device.

Further, the following advantage is obtained regarding promoting activation of the DOC 31. Specifically, as illustrated in FIG. 5, in the DOC 31 configured such that the centerline C2 of the carrier 70 is offset upward with respect to the centerline C1 of the gas inlet 72 and of the gas outlet 73, a main stream (see the hollow arrows in FIG. 5) of exhaust gas mainly passes through the lower region 70*a* of the carrier 70, and hardly passes through an upper region 70*b* corresponding to the upper portion of the carrier 70. However, the upper region 70*b* is also heated by hot air (see the broken line arrows in FIG. 5) of the main stream of exhaust gas, and accumulates the heat of hot air. Therefore, when low-temperature exhaust gas temporarily passes through the lower region 70*a* by a change in the operation state (such as an acceleration pedal off-state) of the engine, although the temperature of the lower region 70*a* is lowered, the temperature of the upper region 70*b* where exhaust gas hardly passes through is maintained at a high temperature to some extent. In other words, imparting a heat accumulation function to the upper region 70*b* of the carrier 70 makes it possible to suppress considerable lowering of the temperature of the carrier 70 as a whole. Introducing high-temperature exhaust gas thereafter makes it possible to speedily raise the temperature of the DOC 31 (carrier 70) to an activation temperature of the DOC 31. Thus, the aforementioned configuration of the DOC 31 is advantageous not only in contributing to size reduction of the engine, but also in promoting activation of the DOC 31.

Further, in the thus-configured engine, the DOC 31 and the DPF 32 are connected to each other via the U-shaped pipe 30*a* so that the flow direction of exhaust gas that has passed through the DOC 31 is reversed in front of the DOC 31 so that the exhaust gas is guided to the DPF 32 and passes through the DPF 32 in front and rear directions. Thus, the DOC 31 and the DPF 32 are disposed close to each other in up and down directions. This is advantageous in disposing the turbo supercharger 60 and the DOC 31, and the EGR device and the DPF 32 close to each other in a compact manner in up and down directions. The DOC 31 and the DPF 32 are covered by a cover from the outside as described above. The cover can be made compact because the DOC 31 and the DPF 32 are disposed close to each other.

The diesel engine as described above is a preferred example of an engine to which an exhaust device for an engine of the invention is applied. The configuration of the diesel engine and the configuration of the exhaust device for the diesel engine can be modified, as necessary, as far as such modifications do not depart from the gist of the invention.

In the embodiment, the invention is applied to a diesel engine. The invention, however, is applicable to a gasoline engine.

Further, in the embodiment, the DPF 32 and the EGR device constitute a processing device of the invention. Alternatively, a power generator to be driven by the engine main body 1, a compressor for a vehicle air-conditioner, or a motor driving unit for a hybrid vehicle may be disposed below the DOC 31 (catalyst device) that is at least disposed at an upper position with respect to the engine main body.

The following is a summary of the invention.

An aspect of the invention is directed to an exhaust device for an engine provided with a plurality of cylinders. The exhaust device for an engine is provided with an engine main body including a cylinder head provided with a manifold exhaust passage therein, the manifold exhaust passage including a gathering exhaust port which communicates with each of the cylinders, the gathering exhaust port being formed in a surface of the cylinder head in an engine width direction orthogonal to a cylinder array direction; a turbo supercharger disposed on the same side as the cylinder head surface and configured to rotate a turbine by exhaust gas discharged from the gathering exhaust port so as to compress intake air; a catalyst device disposed adjacent to the turbo supercharger in the cylinder array direction, and configured to subject a specific component in the exhaust gas that has passed through the turbo supercharger to reaction into a harmless component; and a processing device disposed on the same side as the cylinder head surface of the engine main body. The turbo supercharger is configured to guide the exhaust gas discharged from the gathering exhaust port upward so as to rotate the turbine while forming an upward swirling flow of exhaust gas. The catalyst device is provided with a carrier on which a catalyst is carried, and a container which accommodates the carrier and has an exhaust gas inlet and an exhaust gas outlet on both ends of a lower region of the carrier so as to allow the exhaust gas to mainly pass through the lower region of the carrier in the cylinder array direction. The processing device is at least disposed below the catalyst device.

In the thus-configured exhaust device for an engine, it is possible to dispose the turbo supercharger, the catalyst device, and the processing device at a position near a surface of the engine main body in a compact manner. In particular, according to the configuration of the turbo supercharger, it is possible to dispose the turbo supercharger as a whole at an upper position with respect to the engine main body. Further, according to the configuration of the catalyst device, it is possible to dispose the catalyst device as a whole at an upper position with respect to the engine main body. Therefore, it is possible to dispose the processing device below the catalyst device in a compact manner.

The processing device may be an exhaust gas processing device disposed below the catalyst device and configured to trap the specific component in the exhaust gas that has passed through the catalyst device.

Further, the processing device may include an exhaust gas processing device disposed below the catalyst device and configured to trap the specific component in the exhaust gas that has passed through the catalyst device, and an EGR device disposed below the turbo supercharger and configured to circulate part of the exhaust gas that has passed through the exhaust gas processing device to an intake passage; and the exhaust gas processing device and the EGR device may be disposed side by side in the cylinder array direction.

According to the thus-configured exhaust device for an engine, it is possible to dispose the turbo supercharger, the catalyst device, the exhaust gas processing device, and the EGR device at a position near a surface of the engine main body in a compact manner. In particular, according to the configuration of the turbo supercharger, it is possible to dispose the turbo supercharger as a whole at an upper position with respect to the engine main body. Further, according to the configuration of the catalyst device, it is possible to dispose the catalyst device as a whole at an upper position with respect to the engine main body. Therefore, it is possible to dispose the EGR device and the exhaust gas processing device below the turbo supercharger and the catalyst device in a compact manner. Furthermore, according to the thus-configured exhaust device for an engine, disposing the turbo supercharger, the catalyst device, the exhaust gas processing device, and the EGR device at a position near the surface of the engine main body in a compact manner makes it possible to keep the ambient temperature around the devices at a relatively high temperature. This is advantageous in preventing heat from the exhaust gas from being released, and in promoting activation of the catalyst device.

In the above configuration, preferably, the catalyst device and the exhaust gas processing device may be connected to each other in such a manner that after the exhaust gas that has passed through the turbo supercharger passes through the catalyst device in the cylinder array direction, a flow direction of the exhaust gas is reversed so that the exhaust gas is introduced to the exhaust gas processing device, and the exhaust gas passes through the exhaust gas processing device in the cylinder array direction.

According to the above configuration, it is possible to dispose the turbo supercharger and the catalyst device, and the exhaust gas processing device and the EGR device close to each other in up and down directions in a compact manner.

The above configuration is advantageous when the turbo supercharger is a variable geometry turbo supercharger provided with movable vanes, and is configured such that a flow rate of exhaust gas that flows into the turbine by operation of the movable vanes is adjustable.

In other words, the overall size of the variable geometry turbo supercharger tends to increase in a radial direction, because the turbo supercharger includes a mechanism portion for operating the movable vanes. However, according to the configuration of the exhaust device for an engine, as described above, it is possible to dispose the turbo supercharger at an upper position with respect to the engine main body. This makes it possible to dispose the EGR device below the turbo supercharger in a compact manner, even if the turbo supercharger is a variable geometry turbo supercharger.

As a preferred configuration, the exhaust gas processing device may trap fine particles in the exhaust gas, and the EGR device may include an EGR cooler which cools the exhaust gas to be recirculated to the intake passage, and an EGR valve which adjusts an amount of the exhaust gas to be recirculated to the intake passage.

According to the above configuration, it is possible to dispose the exhaust gas processing device which traps fine particles in the exhaust gas, the EGR cooler, and the EGR valve below the turbo supercharger and the catalyst device in a compact manner.

In the above configuration, preferably, the exhaust device for an engine may further include an exhaust pipe connected to the exhaust gas processing device, and configured to guide the exhaust gas that has passed through the exhaust gas processing device outward in the engine width direction, wherein the EGR device is mounted on a surface of the exhaust pipe at a position opposite to the exhaust gas processing device.

According to the above configuration, it is possible to make the engine compact, without overlapping the EGR device and the exhaust pipe in the engine width direction.

This application is based on Japanese Patent Application No. 2014-036956 filed on Feb. 27, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An exhaust device for an engine provided with a plurality of cylinders, comprising:
   an engine main body including a cylinder head provided with a manifold exhaust passage therein, the manifold exhaust passage including a gathering exhaust port which communicates with each of the cylinders, the gathering exhaust port being formed in a specific side surface which is a surface of the cylinder head in an engine width direction orthogonal to a cylinder array direction;
   a turbo supercharger disposed on the specific side surface and configured to rotate a turbine by exhaust gas discharged from the gathering exhaust port to thereby rotate a compressor connected to the turbine so as to compress intake air;
   a catalyst device disposed adjacent to the turbo supercharger in the cylinder array direction, and configured to subject a specific component in the exhaust gas that has passed through the turbo supercharger to be oxidized; and
   an exhaust gas processing device configured to trap the specific component in the exhaust gas that has passed through the catalyst device, wherein the turbo supercharger is configured to guide the exhaust gas discharged from the gathering exhaust port upward so as to rotate the turbine while forming an upward swirling flow of exhaust gas,
   the catalyst device is provided with a carrier on which a catalyst is carried, and a container which accommodates the carrier and has an exhaust gas inlet on one side of a lower region of the carrier and an exhaust gas outlet on another side of the lower region of the carrier so as to allow the exhaust gas to mainly pass through the lower region of the carrier in the cylinder array direction, and
   the exhaust gas processing device is disposed across the specific side surface away from the engine body and below the catalyst device in a vertical direction of the engine main body.

2. The exhaust device for an engine according to claim 1, wherein
   the catalyst device and the exhaust gas processing device are connected to each other in such a manner that after the exhaust gas that has passed through the turbo supercharger passes through the catalyst device in the cylinder array direction, a flow direction of the exhaust gas is reversed so that the exhaust gas is introduced to the exhaust gas processing device, and the exhaust gas passes through the exhaust gas processing device in the cylinder array direction.

3. The exhaust device for an engine according to claim 2, wherein
   the turbo supercharger is a variable geometry turbo supercharger including movable vanes, and is configured such that a flow rate of exhaust gas that flows to the turbine by operation of the movable vanes is adjustable.

4. The exhaust device for an engine according to claim 1, further comprising:
   an exhaust gas recirculation (EGR) device disposed below the turbo supercharger and configured to recirculate part of the exhaust gas that has passed through the exhaust gas processing device to an intake passage, wherein the exhaust gas processing device and the EGR device are disposed side by side in the cylinder array direction.

5. The exhaust device for an engine according to claim 4, wherein
the catalyst device and the exhaust gas processing device are connected to each other in such a manner that after the exhaust gas that has passed through the turbo supercharger passes through the catalyst device in the cylinder array direction, a flow direction of the exhaust gas is reversed so that the exhaust gas is introduced to the exhaust gas processing device, and the exhaust gas passes through the exhaust gas processing device in the cylinder array direction.

6. The exhaust device for an engine according to claim 5, wherein
the turbo supercharger is a variable geometry turbo supercharger including movable vanes, and is configured such that a flow rate of exhaust gas that flows to the turbine by operation of the movable vanes is adjustable.

7. The exhaust device for an engine according to claim 5, wherein
the exhaust gas processing device traps fine particles in the exhaust gas, and
the EGR device includes an EGR cooler which cools the exhaust gas to be recirculated to the intake passage, and an EGR valve which adjusts an amount of the exhaust gas to be recirculated to the intake passage.

8. The exhaust device for an engine according to claim 7, further comprising:
an exhaust pipe connected to the exhaust gas processing device, and configured to guide the exhaust gas that has passed through the exhaust gas processing device outward in the engine width direction, wherein
the EGR device is mounted on a surface of the exhaust pipe at a position opposite to the exhaust gas processing device.

9. The exhaust device for an engine according to claim 4, wherein
the turbo supercharger is a variable geometry turbo supercharger including movable vanes, and is configured such that a flow rate of exhaust gas that flows to the turbine by operation of the movable vanes is adjustable.

10. The exhaust device for an engine according to claim 9, wherein
the exhaust gas processing device traps fine particles in the exhaust gas, and
the EGR device includes an EGR cooler which cools exhaust gas to be recirculated to the intake passage, and an EGR valve which adjusts an amount of exhaust gas to be recirculated to the intake passage.

11. The exhaust device for an engine according to claim 10, further comprising:
an exhaust pipe connected to the exhaust gas processing device, and configured to guide the exhaust gas that has passed through the exhaust gas processing device outward in the engine width direction, wherein
the EGR device is mounted on a surface of the exhaust pipe at a position opposite to the exhaust gas processing device.

12. The exhaust device for an engine according to claim 4, wherein
the exhaust gas processing device traps fine particles in the exhaust gas, and
the EGR device includes an EGR cooler which cools the exhaust gas to be recirculated to the intake passage, and an EGR valve which adjusts an amount of the exhaust gas to be recirculated to the intake passage.

13. The exhaust device for an engine according to claim 12, further comprising:
an exhaust pipe connected to the exhaust gas processing device, and configured to guide the exhaust gas that has passed through the exhaust gas processing device outward in the engine width direction, wherein
the EGR device is mounted on a surface of the exhaust pipe at a position opposite to the exhaust gas processing device.

14. The exhaust device for an engine according to claim 1, wherein
the turbo supercharger is a variable geometry turbo supercharger including movable vanes, and is configured such that a flow rate of exhaust gas that flows to the turbine by operation of the movable vanes is adjustable.

15. The exhaust device for an engine according to claim 1, wherein an end of the catalyst device and an end of the exhaust gas processing device are connected with each other via a U-shaped pipe, the ends being arranged on one side respectively of the catalyst device and the exhaust gas processing device opposite to other side thereof where the turbo supercharger is arranged in the cylinder array direction.

16. The exhaust device for an engine according to claim 1, wherein a center of the gas inlet and a center of the gas outlet are coaxially aligned on a center line which is offset downward with respect to a centerline of the carrier.

17. An exhaust device for an engine provided with a plurality of cylinders, comprising:
an engine main body including a cylinder head provided with a manifold exhaust passage therein, the manifold exhaust passage including a gathering exhaust port which communicates with each of the cylinders, the gathering exhaust port being formed in a specific side surface which is a surface of the cylinder head in an engine width direction orthogonal to a cylinder array direction;
a turbo supercharger disposed on the specific side surface and configured to rotate a turbine by exhaust gas discharged from the gathering exhaust port to thereby rotate a compressor connected to the turbine so as to compress intake air;
a catalyst device disposed adjacent to the turbo supercharger in the cylinder array direction, and configured to subject a specific component in the exhaust gas that has passed through the turbo supercharger to reaction into a harmless component; and
an exhaust gas processing device configured to trap the specific component in the exhaust gas that has passed through the catalyst device, wherein the turbo supercharger is configured to guide the exhaust gas discharged from the gathering exhaust port upward so as to rotate the turbine while forming an upward swirling flow of exhaust gas,
the catalyst device is provided with a carrier on which a catalyst is carried, and a container which accommodates the carrier and has an exhaust gas inlet on one side of a lower region of the carrier and an exhaust gas outlet another side of the lower region of the carrier so as to allow the exhaust gas to mainly pass through the lower region of the carrier in the cylinder array direction,
the exhaust gas processing device is disposed across the specific side surface away from the engine and below the catalyst device in a vertical direction of the engine main body, and an end of the catalyst device and an end of the exhaust gas processing device are connected with each other via a U-shaped pipe, the ends being arranged on one side respectively of the catalyst device and the exhaust gas processing device opposite to other side thereof where the turbo supercharger is arranged in the cylinder array direction.

* * * * *